(12) United States Patent
Vignato

(10) Patent No.: US 6,502,939 B2
(45) Date of Patent: Jan. 7, 2003

(54) EYEGLASSES OF THE TYPE WITHOUT MOUNTING AND HAVING SUPPLEMENTARY LENSES

(76) Inventor: Arcadio Vignato, Via Dei Colli, 40, 36061 Bassano Del Grappa (Vicenza) (IT)

( * ) Notice: Subject to any disclaimer, the term of this patent is extended or adjusted under 35 U.S.C. 154(b) by 0 days.

(21) Appl. No.: 09/878,807

(22) Filed: Jun. 11, 2001

(65) Prior Publication Data

US 2001/0055091 A1 Dec. 27, 2001

(30) Foreign Application Priority Data

Jun. 16, 2000 (IT) .......................... VI00A0132

(51) Int. Cl.⁷ ............................. G02C 1/02; G02C 9/02
(52) U.S. Cl. ............................. 351/110; 351/47; 351/57
(58) Field of Search .................... 351/47, 57, 48, 351/58, 44, 41, 110

(56) References Cited

U.S. PATENT DOCUMENTS 5,936,700 A * 8/1999 Masunaga ..................... 351/47
6,210,002 B1 * 4/2001 Tachibana ..................... 351/110

* cited by examiner

*Primary Examiner*—Hung Xuan Dang
(74) *Attorney, Agent, or Firm*—Bucknam & Archer

(57) ABSTRACT

Eyeglasses with lenses of the type which are free of mounting, called "extralight" in which the lenses (1) are connected directly to the central bridge and to the extremity of the two lateral risers by means of a threaded attack, wherein the extremities of the risers (2) and extremities of the central bridge (3) have a terminal portion (4) which is inserted from the internal surface of the lens within corresponding niches (5) formed on the internal surface of the lenses and which is threadedly engaged by an element passing through the lenses from the external surfaces.

16 Claims, 4 Drawing Sheets

EYEGLASSES OF THE TYPE WITHOUT MOUNTING AND HAVING SUPPLEMENTARY LENSES

FIELD OF THE INVENTION

The present invention relates to eyeglasses of the type which have no mounting and have supplementary lenses added to the eyeglasses.

BACKGROUND OF THE PRIOR ART

Eyeglasses called "extralight" have been known for a long time. The lenses of these eyeglasses are deprived of mounting and are directly connected to the central small bridge and to the extremity of the two lateral rods.

This new type of eyeglass lens therefore imposed on manufacturers in this field the task of revising the devices capable of supporting the lenses, specifically with respect to the system of connecting the riser to the lens. In the present state of the art, the most common constructive solution consists of anchoring the lens with the extremity of the riser, that is with the terminal part of the rod comprised between the hinge and the lens itself.

The clamping of the lens without any mounting in the proper position with respect to the rods and the small central bridge is obtained by providing the extremities of connection of the rod and the small bridge to be particularly shaped, for instance with a fork shape, which becomes inserted on some openings formed in the same lens. In order to make sure that the processing is more rigid and to avoid that, with use, the lenses lose their optimal inclination with respect to the face of the individual who is using the glasses, occasionally there has been provided that the extremities of the riser and the small bridge be slightly imbedded in the lenses, as it has been described by way of example in the documents WO-A-96/33438 and U.S. Pat. No. 5,847,800.

The use of additional lenses, commonly called supplementary, has also been known. These supplementary lenses are positioned in front of the normal lenses, with different objects, from simple parasol lenses to enlargement lenses, used for instance in microsurgery for views at a short distance and progressive lenses.

Among the many methods for anchoring the supplementary lenses the so called magnetic attack is used. In this method small magnetic plates are mounted on the frame of the eyeglasses, the plates attract other magnetic plates present in the supplementary structures as described for instance in the document WO-A-96/37800.

In the present state of the art the magnetic attachment is carried out between the two planar surfaces of two counterposed magnets which fit together, so that the optimum reciprocal attraction force is the force directed horizontally, that is when the two magnets in addition to fitting together become parallel with respect to each other.

This method of attachment has two drawbacks. The first drawback is due to the fact that it is not always possible to carry out the application of the supplementary lens on the principal mounting with the necessary exactness. The second drawback is due to the fact that a single accidental bump of the eyeglasses is sufficient to cause the supplementary lens to be moved away from its regular position, while remaining magnetically hooked with the result that the vision of the user becomes imperfect.

These drawbacks have been overcome only partially by means of supplementary lenses on a frame which is sufficiently rigid, the frame being provided with lateral projections which have mechanical or magnetic hooks, the hooks being anchored on the rods or on the riser of the principal mounting, preferably corresponding to the hinge. By way of example of this type of mounting, there may be mentioned British A-2338566, EP-A-0773463, EP-A-0743545, WO-A-97/16761 and U.S. Pat. No. 5,877,838.

SUMMARY OF THE INVENTION

One object of the present invention is to provide an attachment system for the riser and the small bridge to the lenses to be mounted on eyeglasses, of the type free of mounting, which offers advantages over the similar known products.

Specifically the attachment system of the riser of the invention is characterized by simplicity of execution, minimum cluttering and pleasant aesthetic appearance.

Another object of the invention is to provide a system of attachment of the riser and the central small bridge to the lenses free of mounting which is sufficiently strong and easily cleansed.

Still another object of the invention is to provide a system of attachment of the riser and the small bridge to the lenses free of mounting which does not depend on the thickness and the shape of the lenses.

Another object of the invention is to provide a system for attachment of the riser to the lens which permits the application to the eyeglass in a rapid and sure manner.

A further object of the invention is to provide supplemental lenses, free of mounting and having magnetic small plates, characterized by the fact that they allow the user to position them extremely exactly and rapidly on the principal eyeglass.

Still another object is to provide small magnetic plates of minimum thickness which may be mounted on the supplemental lenses.

A further object of the invention is to provide small magnetic plates which require an anchoring system on the body of the supplemental lens which is simple, of rapid execution, minimum cluttering and also valid aesthetically.

The inherent objects to the system of attachment of the riser and the small bridge to the lenses are achieved by providing that the extremities of the riser and the central small bridge have a terminus which is inserted from the internal surface of the lens within corresponding niches shaped as a lozenge or diamond, the niches being formed on the internal surface of the lens and having an opening through the lens on the bottom wall. In addition the invention provides that the terminal portion have a braid, male or female, which has a protruding head which protrudes through the above opening from the opposite part of the lens.

A first embodiment of the braid is constituted by a threaded hole, formed in the terminal portion mentioned hereinabove, which is engaged in the niche formed on the lens and on which the braid is screwed, through the opening formed on the lens, by means of a threaded pin, provided with a head, which is inserted from the external part of the lens.

According to a second embodiment, the braid is constituted by an element protruding beyond the terminal portion and which engages in the niche formed in the lens and through the opening formed on the lens to allow the screwing of a head from the external part of the lens.

In both embodiments the niche formed on the internal wall of the lens and shaped as a diamond, is disposed in a manner that its longitudinal axis is perpendicular to the axis of the opening formed in the lens, which is necessary to allow the passage of the threaded element.

Constructively the invention provides that the riser is shaped in a manner to present two filiform elements and a small block between the two filiform elements, all of them being disposed reciprocally superimposed with the two filiform elements projecting to the rear from the lens up to the hinge while the intermediate small block which is of limited length and a little greater than the depth of the niche, constitutes the threaded body, by means of a threaded opening or a threaded protruding pin.

With this construction the clamping and support of the lenses are assured as in the similar embodiments but there is also the advantage that on the external surface of each of the two lenses only two heads protrude, that is those heads being necessary for the threaded connection of the riser and the small bridge and permitting application to the eyeglass in a rapid and simple manner supplemental lenses such as filters or parasol lenses. In fact the inherent objects that the supplemental lenses obtain due to the fact that supplemental lenses are provided on their internal surfaces with magnetic blocks which are disposed in such a manner that when the supplemental lenses are positioned above the lenses of the eyeglasses, the magnetic blocks are anchored, due to a magnetic effect on the heads so that they constitute the support of the supplemental lenses. Specifically, the exact positioning of the supplemental lenses over the main eyeglass lenses is obtained by providing the magnetic plate with a seat in a cavity within which the corresponding protrusion of the main lens is present when the supplemental lens is placed in contact therewith.

BRIEF DESCRIPTION OF THE DRAWINGS

These and other characteristics of the invention are better understood by the description of a few possible embodiments provided as illustration and non-limiting examples, by reference to the drawings, of which.

DETAILED DESCRIPTION OF THE INVENTION

Figure 1:
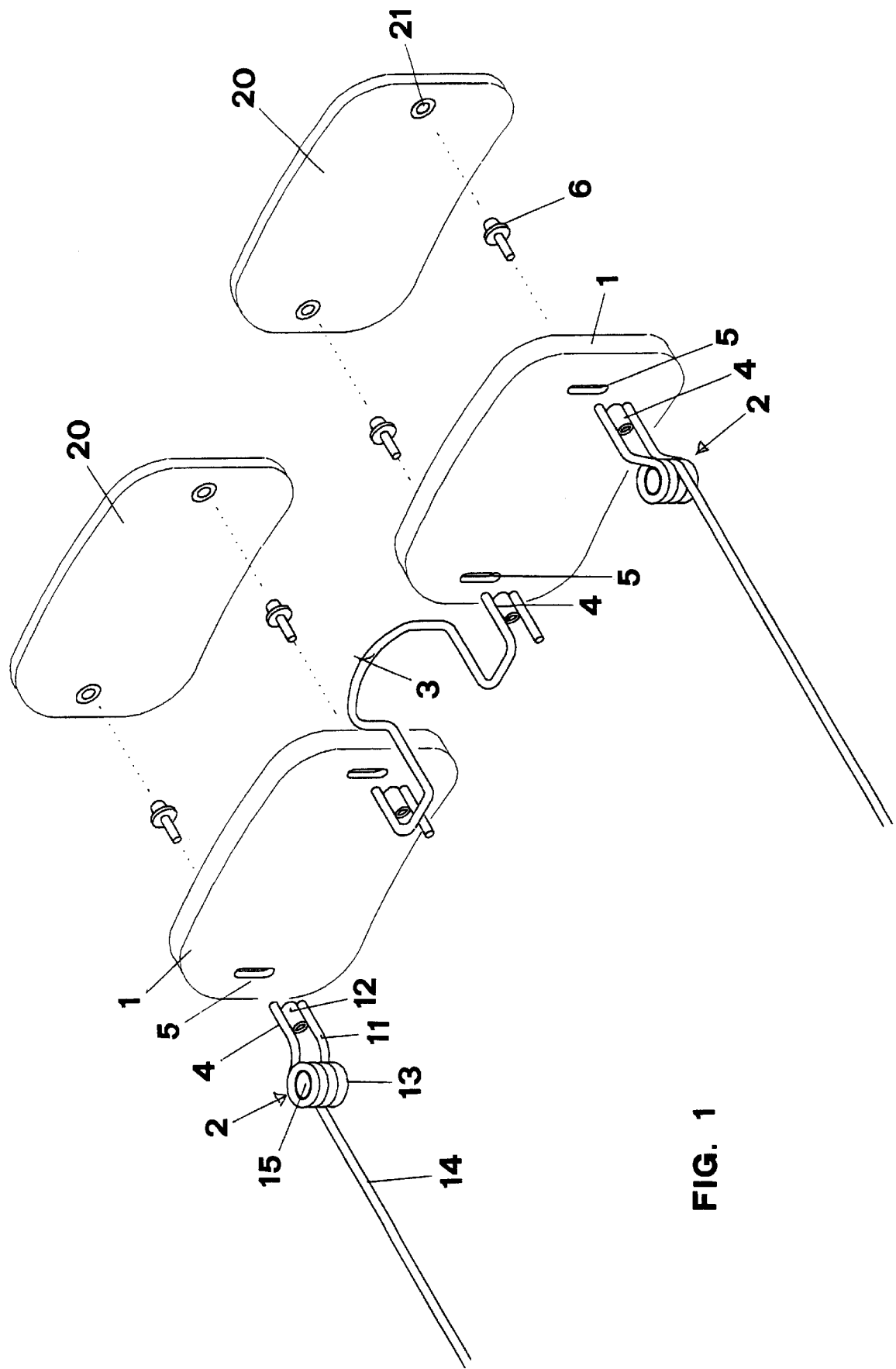
FIG. 1 is a perspective exploded view of a pair of eyeglassses without mounting according to the invention.

As shown in FIG. 1, in the type of glasses called "extralight" and without mounting the lenses (1) are supported only by the lateral risers (2) and by the central bridge (3). According to the present invention the clamping of the lateral risers (2) and the bridge (3) is achieved by providing that the extremities of the risers and the central bridge have a terminal portion (4) which is inserted from the interior part or surface of the lens within niches (5) formed in the internal wall of the lens (1). Niches (5) are provided on the bottom wall thereof with an opening (8) formed in the lens itself. This terminal portion has a braid, male or female, which is engaged with head (6), the latter protruding on the external part of lens (1).

Figure 4:
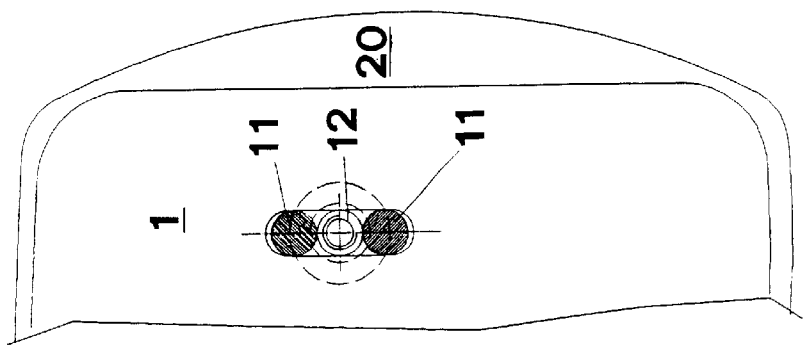
FIGS. 2, 3 and 4 are exploded, elevational and side views, respectively, of a first embodiment of the system of clamping the riser to the lens.
Figure 3:
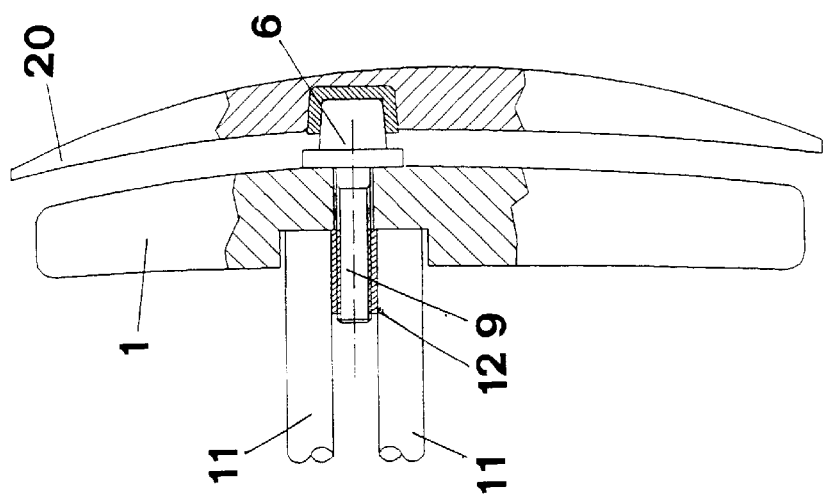
Figure 2:
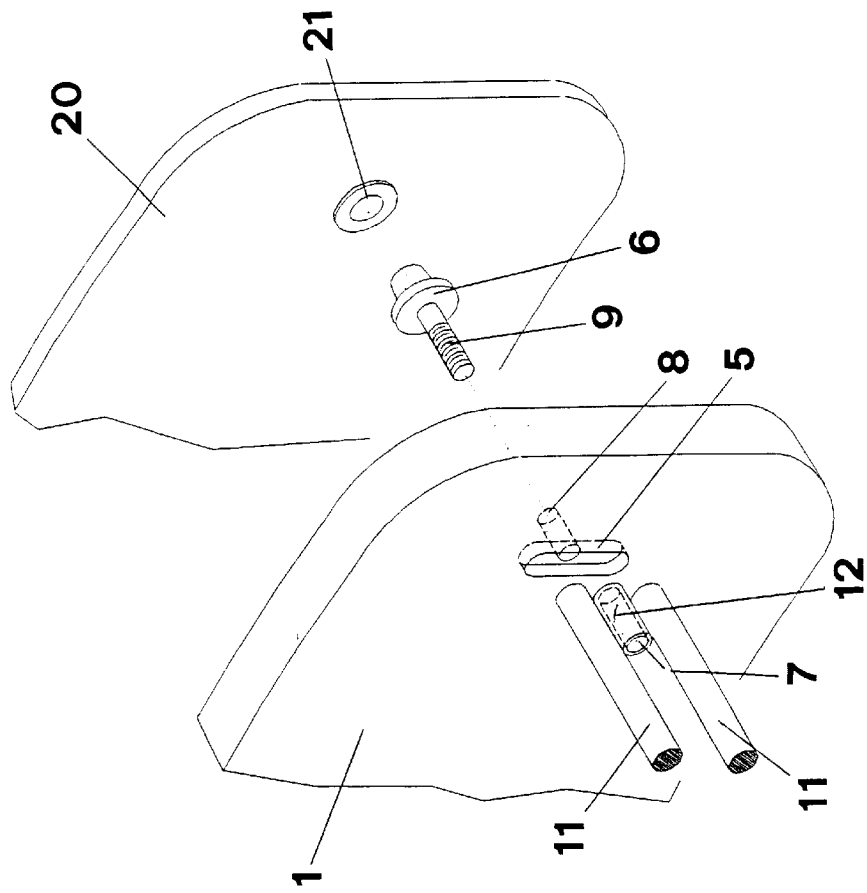

As shown in FIGS. 2–4, a first embodiment of the braid is constituted by threaded opening (7), formed in portion (4) which engages with niche (5). The opening is threadedly engaged with threaded pin (9) which passes through opening (8) formed in the lens. A head (6) is provided on pin (9). Pin (9) is inserted from the external part or surface of the lens.

Figure 7:
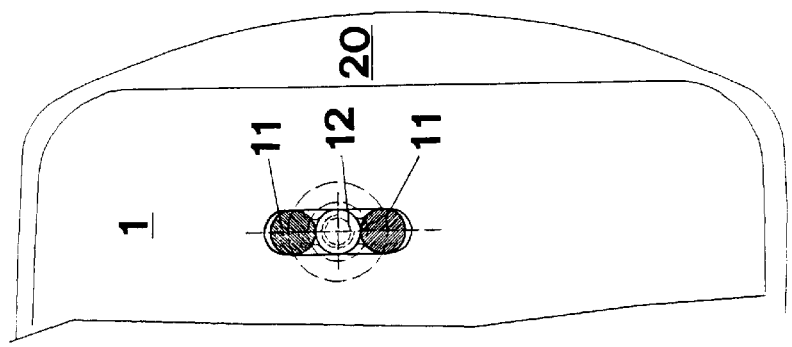
FIGS. 5, 6 and 7 are exploded, elevational and side views, respectively, of a second embodiment of the system of clamping the riser to the lens.
Figure 6:
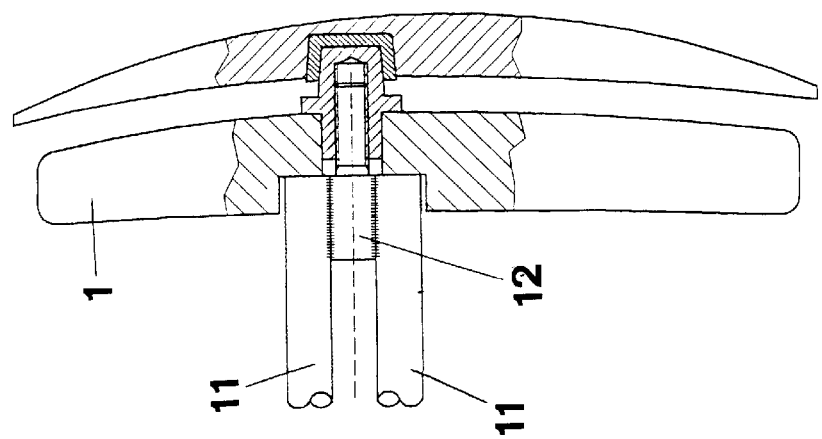
Figure 5:
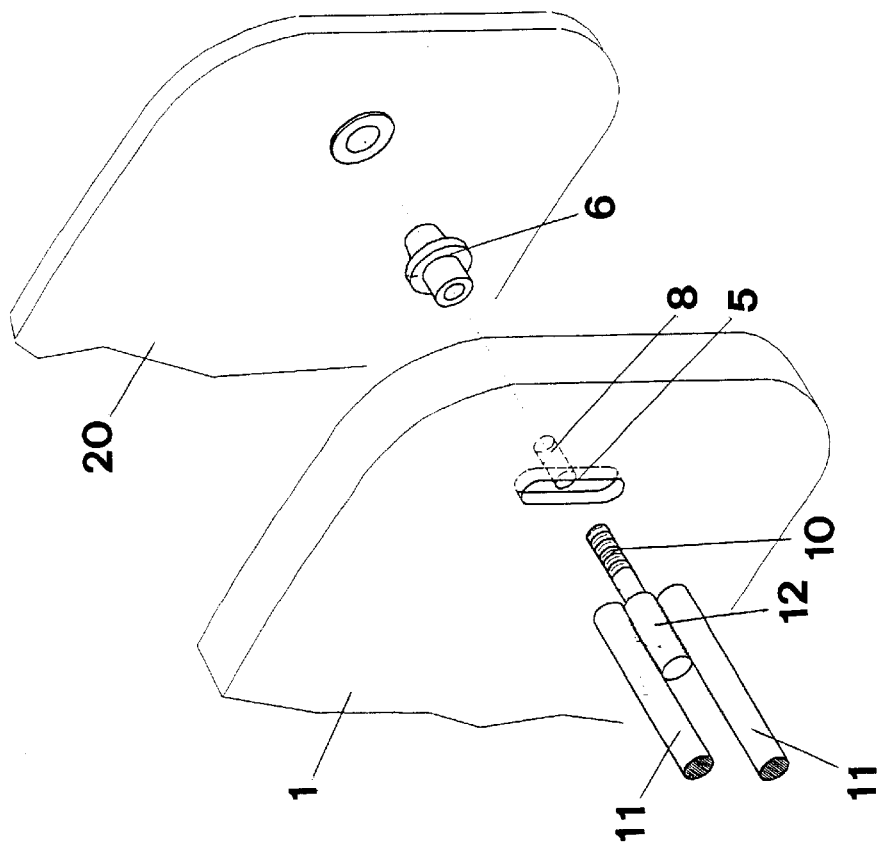

As shown in FIGS. 5–7, a second embodiment of the braid is constituted by a threaded element or pin (10) which protrudes from the terminal portion (4) of the riser and which by means of opening (8) formed in the lens (1), allows the screwing of head (6) from the exterior surface of the lens itself.

As shown in the figures, the riser (2) is formed by two filiform elements (11) which extend to the rear of the lens (1) from hinge (13) while the central block (12), of limited length and a little superior to the depth of niche (5), constitutes the threaded body of female type, that is it is provided with threaded opening (7), and the male type that is provided with threaded pin (9).

A first advantage obtained with the constructive solutions of the invention resides in the possibility for the manufacturer of eyeglasses of producing a single type of riser (2), in which the threaded portion constituted by threaded pin (9) or the threaded element (10), is sufficiently long so that it may be cut to the proper length by the optician as a function of the thickness of lenses (1).

A further advantage obtained with the constructive solution of the invention is the possibility of utilizing supplemental lenses (20) which do not require a supporting frame but are clamped or mounted on the corresponding lenses (1) by the anchoring action exerted by the two magnetic blocks (21), applied on the internal surface of the supplemental lens, on heads (6) which protrude from the external surface of the main lens itself.

Figure 10:
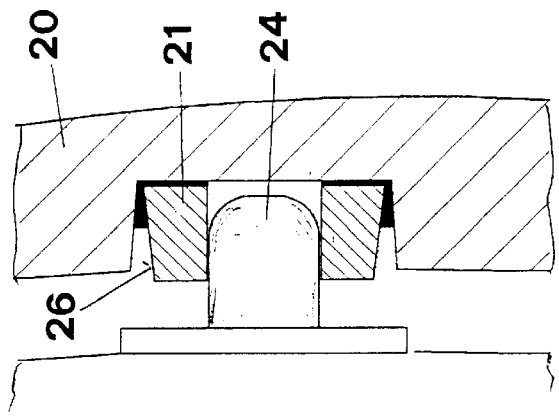
FIGS. 9 and 10 show in detail two different shapes of the small magnetic plate present in the supplemental lens.
Figure 9:
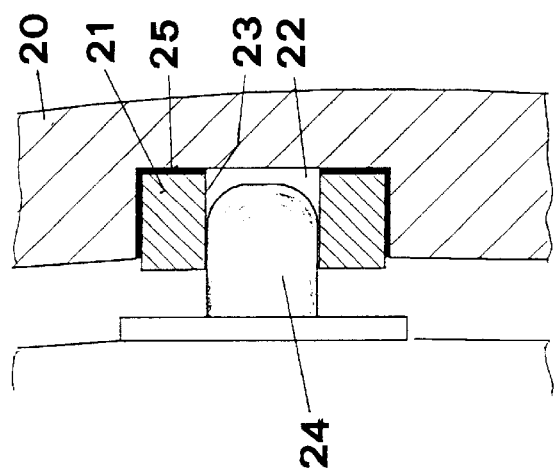
Figure 8A:
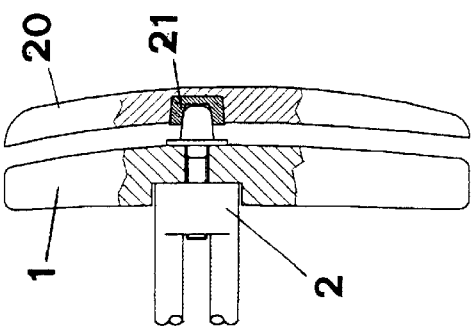
FIGS. 8 and 8A show in detail the area of clamping the supplemental lens to the eyeglass lens, exploded and joined respectively.
Figure 8:
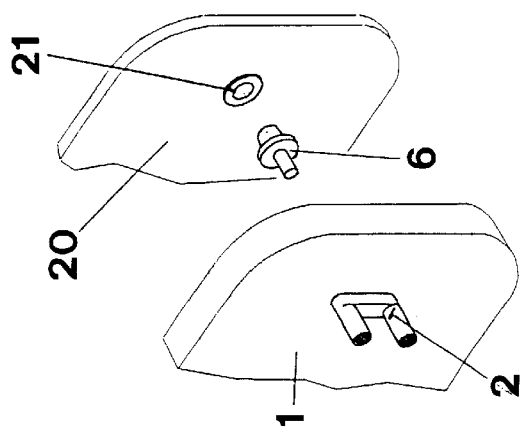

As shown in FIGS. 8 to 10, a further novel characteristic of the invention resides in the fact that the magnetic plate (21) is inserted within niche (22) formed on the supplemental lens (20) and this magnetic plate is provided with a seat in the cavity (23), within which the corresponding portion (24) of head (6) is inserted. The protruding portion (24) is present on the main lens when the supplemental lens is placed substantially in contact with the main lens.

The magnetic plate (21) contained in the interior of niche (22), has a cylindrical hollow shape, preferably with a central opening and the anchoring of the magnetic plate to the supplemental lens (20) is achieved by the use of a film of glue (25).

Advantageously the magnetic plate (21) has the external surface (26) of diverging trunco-conical shape, so that the film of glue (25) is allowed to be disposed with a greater mass along the external border and therefore to ensure greater anchoring of the plate within niche (22).

A possible variation of the invention provides the magnetic plate (21) to be provided with a protrusion which is inserted in the interior of a corresponding seat with a cavity formed on the mounting eyeglasses.

Obviously forms of achievement different from the illustrated embodiments are possible, without departing from the subject matter of the claims.

What is claimed is:

1. Eyeglasses with lenses which are free of mounting, comprising:

a) a pair of temples or risers, each having a hinge portion and an endpiece;

b) a central bridge having a terminal portion at each end thereof;
c) a pair of lenses, each being associated with a temple and a central bridge extending therebetween, each of said lenses having formed on an internal surface substantially diamond shaped niches adapted to receive therein the headpiece of the associated temple and the respective terminal portion of said central bridge, said endpieces and terminal portions having shapes corresponding to niches, each said niche having a hole formed on a bottom wall and extending through the lens; and
d) a head associated with each endpiece of said temples and each terminal portion of said central bridge provided on external surfaces of said lenses for threaded engagement with each said associated endpiece of said temples and each associated terminal portion of said central bridge via each respective hole.

2. The eyeglasses according to claim 1, wherein the threaded engagement of said head with each said associated temple endpiece and each associated central a bridge terminal portion includes a threaded opening formed in each temple endpiece and each central bridge terminal portion engaged in said respective-niches, and a threaded pin attached to each head and received in said respective holes from the external surfaces of said lenses to threadedly engage respective threaded openings.

3. The eyeglasses according to claim 1, wherein the threaded engagement of said head with each said associated temple endpiece and each associated central bridge terminal portion includes a threaded element extending from each temple endpiece and each central bridge terminal portion through each respective opening and threadedly engaged with each said head.

4. The eyeglasses according to claim 1, wherein the longitudinal axis of said niches and the corresponding openings are perpendicular to each other.

5. The eyeglasses according to claim 1, wherein each temple endpiece and each central bridge terminal portion comprise two filiform elements and a block disposed intermediate said filiform elements so that said block and said filiform elements are superimposed one over the other for receipt in said niches wherein block is a little superior to the depth of niche and includes the threaded engagement to head.

6. The eyeglasses according to claim 5, wherein the intermediate block is provided with a threaded opening.

7. The eyeglasses according to claim 5, wherein said intermediate block has a protruding threaded element.

8. The eyeglasses according to claim 1, wherein on the external surface of each of the two lenses protrude only the heads of the threaded connection of the temple endpiece and central bridge terminal portion.

9. The eyeglasses according to claim 1, which further includes means for mounting of supplemental lenses, said supplemental lenses being provided on their internal surface with two magnetic blocks disposed in such a manner that when said supplemental lenses are positioned above the lenses, said magnetic blocks are anchored due to a magnetic action on said heads to thereby constitute the support of the supplemental lenses.

10. The eyeglasses according to claim 9, wherein the magnetic blocks are provided with a seat in a cavity and a corresponding protrusion present on the eyeglass lens is inserted in said seat when said supplemental lens is placed substantially in contact with said eyeglass lens.

11. The eyeglassses according to claim 9, wherein the magnetic blocks are provided with a protrusion which is inserted in a corresponding seat having a cavity present on the eyeglass lens when said supplemental lens is placed substantially in contact with said eyeglass lens.

12. The eyeglasses according to claim 9, wherein each magnetic block is inserted partially within a niche formed on the supplemental lens.

13. The eyeglasses according to claim 12, wherein each magnetic block has a hollow cylindrical shape.

14. The eyeglasses according to claim 12, wherein each magnetic block has the external side surface with a slightly diverging trunco-conical cross section.

15. The eyeglasses according to claim 12, wherein each magnetic block has a cavity which forms a seat of cylindrical shape going through the entire thickness of the block.

16. The eyeglasses according to claim 12, wherein anchoring of the magnetic blocks to the supplemental lens is carried out by means of a film of glue.

* * * * *